Sept. 12, 1950 G. G. HARRINGTON 2,521,791
REPLACEABLE BLADE BIT
Filed Sept. 21, 1945 2 Sheets-Sheet 1

G. G. HARRINGTON.
INVENTOR.

BY Lester B. Clark
 & Ray L. Smith
ATTORNEYS.

Sept. 12, 1950  G. G. HARRINGTON  2,521,791
REPLACEABLE BLADE BIT

Filed Sept. 21, 1945  2 Sheets-Sheet 2

G.G. HARRINGTON
INVENTOR.

BY Lester B. Clark
+ Ray L. Smith
ATTORNEYS

Patented Sept. 12, 1950

2,521,791

UNITED STATES PATENT OFFICE 2,521,791

REPLACEABLE BLADE BIT

George G. Harrington, Houston, Tex.

Application September 21, 1945, Serial No. 617,766

1 Claim. (Cl. 255—61)

The invention relates to a welded on or replaceable blade fish tail bit of the type used in rotary well drilling.

In welded on blade bits the cutting blades which are subject to wear are positioned against portions of the body and then affixed in place by welding. In the past it has been almost necessary to bring such bits into a shop equipped to perform the operation by having suitable jigs and fixtures to receive the bit body, to receive the bit blade to be affixed, and to so arrange the parts and hold them securely during welding so as to insure the proper positioning and symmetry of the finished bit. The foregoing procedure is costly and incurs delay whereas the present invention is intended to provide a blade which can be readily finished at the time of manufacture, shipped to the location where the bit is to be used and accurately welded to a bit body.

The improvement consists in arranging the bit body with the blades to be welded thereon with interfitting or abutting parts to insure accuracy of position and symmetry of the bit by the mere placing of the blade portion against the body.

It is one of the objects of the invention to provide a replaceable blade bit body and blade therefor with interfitting dowel and socket portions to obtain accurate positioning of the blade on the body for welding.

It is also an object of the invention to provide a replaceable blade for drill bits which can be fabricated and accurately finished ready for attachment to a bit body.

Another object is to provide a blade portion for welding to a fish tail bit body which has a lateral offset edge shaped to abut like edges on adjacent blade portions which is so shaped that when the several portions are abutting the portions will be accurately positioned on the bit body for welding thereto.

It is also an object to fit two or more blade portions together in abutting relation with each other in order to accurately position such portions upon the back-up lugs of a fish tail bit body.

Another object is to provide a plurality of blade portions for welding to a bit body which portions are interfitting or abutting in such manner that the portions will be accurately positioned for welding with respect to each other and to the bit body without the use of jigs or fixtures.

Other and further objects of the invention will be readily apparent from the following description and the accompanying drawings, wherein.

Figure 1:
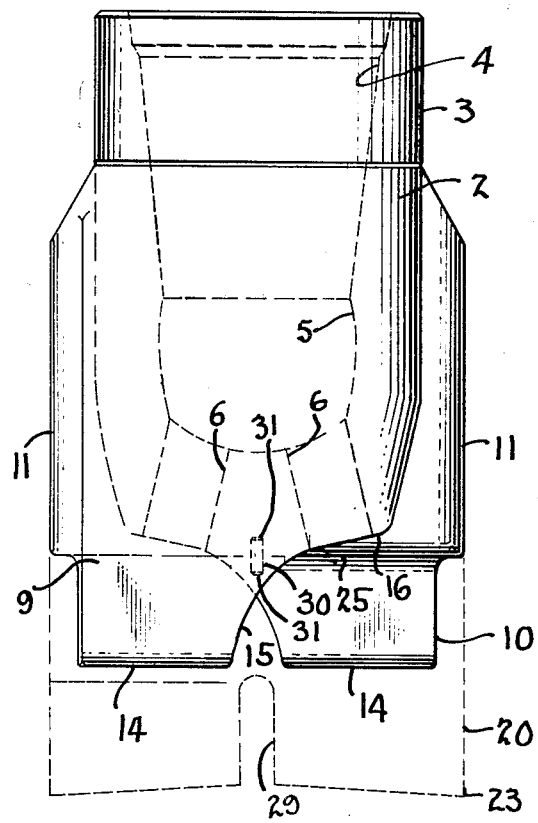
Fig. 1 is a side elevation of a bit body and showing the outline of the cutting blade in dotted lines.

In Fig. 1 the bit body 2 is a forging or casting of suitable metal having a cylindrical portion 3 in which the box or threaded socket 4 has been formed so as to attach the bit to a drill stem or drill collar for use. This socket continues into the body to form the pocket 5 from which the discharge ports 6 extend so as to permit the discharge of flushing fluid to the bit blades.

Figure 2:
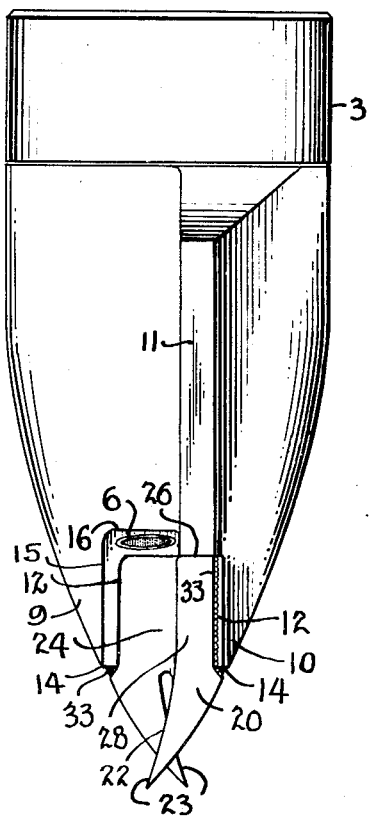
Fig. 2 is an edge elevation of the bit body with the blade affixed thereto.

The body 2 is rounded in form toward the lower end as seen in Fig. 2 and has formed integrally therewith the two opposite combination reaming and backup lugs 9 and 10. These backup lugs are of peculiar form in that they extend laterally from the body 2 as at 11 to define the gauge of the bit, they each have a forward cutting blade receiving and driving face 12 which approximates the radius of the bit. Each of the backup lugs has a straight bottom edge 14 and a curved edge 15 which extends upwardly and laterally across the body 2 to form a shoulder 16 through which the port 6 discharges. While two such lugs have been shown in Fig. 1, three and four lugs may be provided for three-way and four-way bits.

Figure 3:
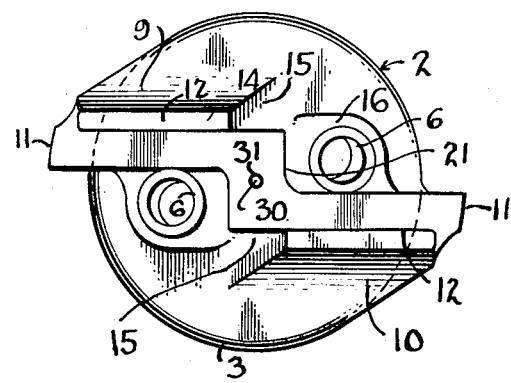
Fig. 3 is a bottom plan view looking up at the bottom of the bit of Fig. 2.

The cutting blade 20 is of particular shape and as seen in Fig. 2 could be described as of an offset form to fit into a similarly shaped offset space 21 formed in the lower end of the body 2 by the backup lugs 9 and 10 which are oppositely facing and offset on opposite sides of a diameter to such an extent that the forward faces 22 of the cutting areas 23 on each side of the blade 20 will be almost aligned on a diameter as seen in Fig. 2. The cross or offset portion 24 of the blade spans the middle of the body. A kerf 29 separates the cutting areas. The blade is shown in dotted lines in Fig. 1, in place in Fig. 2 and omitted in Fig. 3.

The space 21 is defined by the shoulder or stop 25 against which the upper edge 26 of the blade 20 is adapted to abut.

Great difficulty has been encountered in the past in accurately positioning the blade on the body 2 so that the blade is balanced and the gauge cutting or reaming edges 28 of the blade equally spaced from the center line or axis of rotation of the bit. The present bit and blade provide for easy, accurate and ready positioning of the blade in the body by the use of the dowel pin 30 fitted into the sockets 31 in the body 2 and the cross portion 24. The pin may be loose in both sockets or fixed in either one as desired. With this construction it is only necessary to slide the blade into the space in the lower end of the body and between the backup blades. The dowel pin slips into the socket and the accurate position of the blade is insured.

The welding metal 33 can be then positioned along the edges of the blade and backups and the bottom to affix the blade for use. When a worn blade is to be removed, a cutting torch will be applied and the old blade cut loose. A new blade can be quickly applied.

Figure 4:
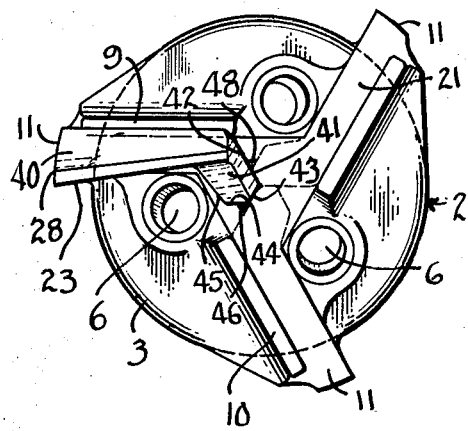
Fig. 4 is a bottom plan view looking up at the bottom of a bit embodying the invention and illustrating three blades.
Figure 5:
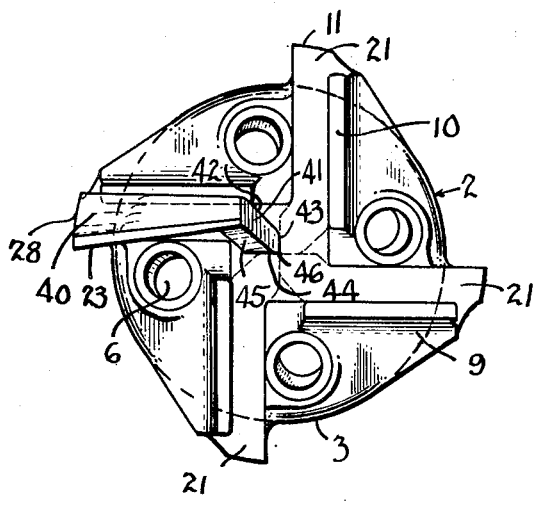
Fig. 5 is a bottom plan view looking up at the bottom of the bit and illustrating a construction having four blades.

While two-way or two blade bit has been illustrated, it seems obvious that three blade or four blade bits could follow the same construction and Figs. 4 and 5 show such constructions. The blade 20 of Figs. 1 and 2 is shown as being an integral construction but of course it could be made in two parts where the parts would abut together and fit the dowel pin and socket arrangement previously described. When so made, each of the blades would be designated as a blade portion.

Fig. 4 shows a three-way fish tail bit wherein three blade potrions 40 have been illustrated. One of such portions is shown in position in Fig. 4. This blade portion 40 is fitted into the recess 21, but it is illustrated as having a lateral or offset portion 41 which extends inwardly toward the center of the bit. This lateral portion is defined by the faces 42, 43, 44, and 45 with the faces 42 and 45 almost parallel and joining the bases of the faces 43 and 44 which come together at an apex 46. This configuration is provided so that the face 42 on one blade portion will engage the face 43 on another blade portion and Fig. 4 shows the three blades as abutting together and as having been fixed in place with the beads of welding material 48.

Fig. 5 shows the same arrangement as in Fig. 4 except that the angular relationship of the abutting faces is such that the four lateral extensions of the four blade portions will fit together. The arrangement of these abutting faces is such that the blade portions must be accurately positioned in the recesses of the bit body in order to weld them in place.

Broadly the invention involves the quick and accurate positioning of a replaceable blade on a bit body.

What is claimed is:

A fish tail bit comprising a body, three backup lugs extending downwardly therefrom, said lugs being offset adjacent the center of the body to form staggered blade receiving spaces, a blade portion in each space, said blade portions each having an offset extension formed with faces, the faces of adjacent extensions fitting together at the body center to accurately position such blade portions substantially radially of said body, and welding material affixing said blade portions together, at least two of said faces of each blade meeting in an apex at approximately 120° to fit with complementary faces of the other blades.

GEORGE G. HARRINGTON.

REFERENCES CITED

The following references are of record in the file of this patent:

UNITED STATES PATENTS

| Number | Name | Date |
| --- | --- | --- |
| 1,388,490 | Suman | Aug. 23, 1921 |
| 1,845,168 | McHaley | Feb. 16, 1932 |
| 1,858,988 | Duda | May 17, 1932 |
| 1,901,643 | Harrington | Mar. 14, 1933 |
| 1,902,885 | Nixon | Mar. 28, 1933 |
| 2,132,493 | Phipps | Oct. 11, 1938 |
| 2,190,434 | Pivoto | Feb. 12, 1940 |
| 2,246,812 | Pivoto | June 24, 1941 |